US011929050B2

(12) United States Patent
Uchida et al.

(10) Patent No.: US 11,929,050 B2
(45) Date of Patent: Mar. 12, 2024

(54) STRAINER DEVICE

(71) Applicant: YAMAHA CORPORATION, Hamamatsu (JP)

(72) Inventors: Yuki Uchida, Hamamatsu (JP); Norihiko Ishimatsu, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 157 days.

(21) Appl. No.: 17/673,969

(22) Filed: Feb. 17, 2022

(65) Prior Publication Data

US 2022/0270574 A1 Aug. 25, 2022

(30) Foreign Application Priority Data

Feb. 24, 2021 (JP) ................................ 2021-027781

(51) Int. Cl.
*G10D 13/18* (2020.01)

(52) U.S. Cl.
CPC .................................. *G10D 13/18* (2020.02)

(58) Field of Classification Search
CPC ..................................................... G10D 13/18
See application file for complete search history.

(56) References Cited

U.S. PATENT DOCUMENTS 1,413,445 A * 4/1922 Wilson .................. G10D 13/02 84/415
5,684,257 A * 11/1997 Yanagisawa ........... G10D 13/18 84/415
6,846,978 B2 * 1/2005 Dorfman ................ G10D 13/02 84/411 R
7,220,905 B2 * 5/2007 Takegawa ............. G10D 13/02 84/415
7,301,087 B2 * 11/2007 Takegawa ............. G10D 13/18 84/411 R
7,741,550 B2 * 6/2010 Miyajima ............. G10D 13/18 84/415

(Continued)

FOREIGN PATENT DOCUMENTS

CN 2854757 Y 1/2007
JP 4977161 B2 7/2012

OTHER PUBLICATIONS

Extended European Search Report issued in European Application No. 22158191.1 dated Jul. 5, 2022.

*Primary Examiner* — Robert W Horn
(74) *Attorney, Agent, or Firm* — ROSSI, KIMMS & McDOWELL LLP

(57) ABSTRACT

A strainer device for a drum includes a fixing portion attachable to a shell of the drum, an operation portion, a movable portion moved with respect to the fixing portion to change a snare wire between an ON state and an OFF state, a pressing member, a cam portion including a cam surface, and a follower configured to be relatively displaced with respect to the cam portion between a first position and a second position in the cam portion while the pressing member is pressing against the cam surface. A direction of a force acting on the follower with respect to the cam portion is directed to: a side of the first position within the cam portion in a state where the follower is disposed in the first position, and a side of the second position in a state where the follower is disposed in the second position.

14 Claims, 10 Drawing Sheets

(56) References Cited

U.S. PATENT DOCUMENTS

| | | | | |
|---|---|---|---|---|
| 7,977,558 | B2 * | 7/2011 | Nakata | G10D 13/18 84/415 |
| 8,017,846 | B2 * | 9/2011 | Miyajima | G10D 13/02 84/415 |
| 8,163,988 | B2 * | 4/2012 | Holl | G10D 13/18 84/415 |
| 2007/0079686 | A1 | 4/2007 | Hsieh | |
| 2009/0133564 | A1 | 5/2009 | Miyajima | |
| 2010/0242707 | A1 | 9/2010 | Miyajima | |
| 2020/0105234 | A1 * | 4/2020 | Pawlovich | G10D 13/18 |
| 2022/0270574 | A1 * | 8/2022 | Uchida | G10D 13/02 |
| 2022/0415288 | A1 * | 12/2022 | Liao | G10D 13/02 |

* cited by examiner

STRAINER DEVICE

CROSS-REFERENCE TO RELATED APPLICATIONS

This application is based on and claims priority under 35 USC 119 from Japanese Patent Application No. 2021-027781 filed on Feb. 24, 2021, the contents of which are incorporated herein by reference.

TECHNICAL FIELD

The present disclosure relates to a strainer device for a drum.

BACKGROUND ART

In general, a strainer device used in a drum such as a snare drum includes a fixing portion attached to a shell of the drum and a movable portion movable with respect to the fixing portion. A snare wire is attached to the movable portion, and by rotating a lever, the movable portion can be displaced between an ON position where the snare wire is brought into contact with a drum head of the drum and an OFF position where the snare wire is separated from the drum head. A drum main body of the drum may be turned upside down when the drum is carried by a user. At this time, if the lever is rotated by its own weight, a position of the snare wire is inadvertently and unintentionally changed.

Therefore, in JP-B-4977161, a mechanism is provided for holding a position of a snare wire at each of an ON position and an OFF position. For example, regarding the ON position, a lock pin is fitted into a concave portion to hold the snare wire at the ON position. Regarding the OFF position, the snare wire is maintained at the OFF position by providing a spring that pushes the snare wire in a direction away from a drum head of the drum.

However, in JP-B-4977161, it is necessary to provide separate members such as the lock pin and the spring in order to hold the snare wire at each of an ON position and an OFF position, and a configuration of the mechanism for holding the snare wire is not simple.

SUMMARY OF INVENTION

An object of the present disclosure is to provide a strainer device that can stably maintain an ON state and an OFF state of a snare wire with a simple configuration.

An aspect of non-limiting embodiments of the present disclosure relates to provide a strainer device for a drum, the strainer including:

- a fixing portion attachable to a shell of the drum;
- an operation portion configured to be rotatable with respect to the fixing portion;
- a movable portion configured to be moved with respect to the fixing portion in accordance with a rotation of the operation portion to change a snare wire between an ON state where the snare wire is in contact with a drum head of the drum and an OFF state where the snare wire is separated from the drum head;
- a pressing member;
- a cam portion including a cam surface provided on one of the movable portion or the operation portion; and
- a follower provided on the other of the movable portion or the operation portion, and configured to be relatively displaced with respect to the cam portion between a first position and a second position in the cam portion in accordance with the rotation of the operation portion while the pressing member is pressing against the cam surface of the cam portion,
- in which a direction of a force acting on the follower with respect to the cam portion is directed to:
  - a side of the first position within the cam portion in a state where the follower is disposed in the first position; and
  - a side of the second position in a state where the follower is disposed in the second position.

Also, another aspect of non-limiting embodiments of the present disclosure relates to provide a strainer device for a drum, the strainer device including:

- a fixing portion attachable to a shell of the drum;
- an operation portion configured to be rotatable with respect to the fixing portion;
- a movable portion configured to be moved with respect to the fixing portion in accordance with a rotation in a one direction of the operation portion to change a snare wire between an ON state where the snare wire is in contact with a drum head of the drum and an OFF state where the snare wire is separated from the drum head;
- a cam portion including a cam surface provided on one of the movable portion or the operation portion;
- a follower provided on the other of the movable portion or the operation portion, and configured to move along the cam surface; and
- a pressing member configured to press the follower against the cam surface,
- in which the cam surface includes:
  - a first region that generates a first component of power in a direction opposite to the one direction, the first component of power being added to a counterforce of a first pressed power on the first region of the cam surface received from the follower; and
  - a second region that generates a second component of power in the one direction, the second component of power being added to a counterforce of a second pressed power on the second region of the cam surface received from the follower.

According to an aspect of the present disclosure, it is possible to stably maintain an ON state and an OFF state of a snare wire with a simple configuration.

DESCRIPTION OF EMBODIMENTS

Hereinafter, embodiments of the present disclosure will be described in detail with reference to the drawings.

Figure 1:
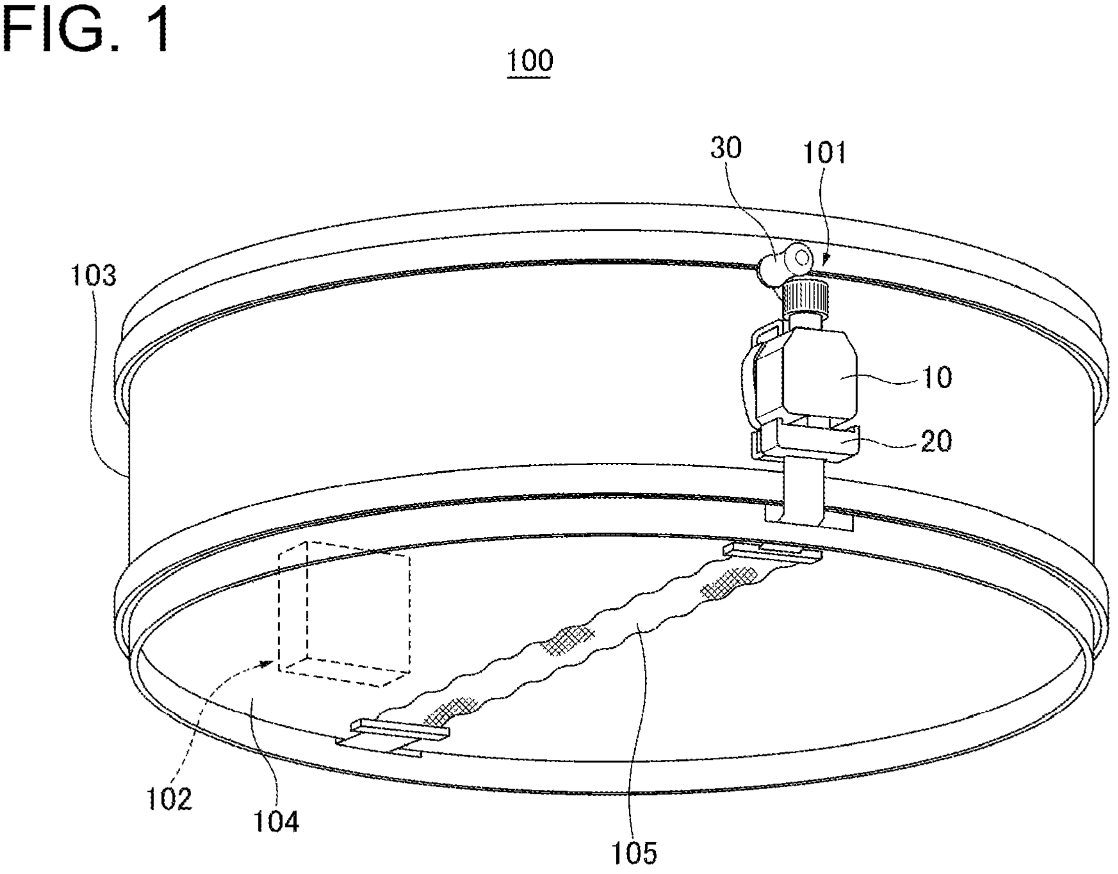
FIG. 1 is a perspective view of a percussion instrument to which a strainer device is applied.

FIG. 1 is a perspective view of a percussion instrument 100 to which a strainer device according to an embodiment of the present disclosure is applied. The percussion instrument 100 is, for example, a snare drum. The percussion instrument 100 has a shell 103. A batter head (drum head) is disposed in one opening (on a front surface side) of the shell 103 having cylindrical shape, and a resonance head 104 (drum head) is disposed in the other opening (on a back surface side) of the shell 103. A plurality of lugs (not shown) are provided on an outer peripheral surface of the shell 103 at equal intervals. A snare wire 105 is provided on an outer surface of the resonance head 104.

On the outer peripheral surface of the shell 103, a pair of strainer devices are disposed at symmetrical positions along a diameter direction of the shell 103. The strainer device includes a movable-side strainer 101 and a fixed-side strainer 102. The movable-side strainer 101 and the fixed-side strainer 102 are disposed at positions avoiding the lugs. Each of the movable-side strainer 101 and the fixed-side strainer 102 may be referred to as a strainer device. Both ends of the snare wire 105 are coupled to the movable-side strainer 101 and the fixed-side 102 by a string member, a tape material, or the like.

Hereinafter, the movable-side strainer 101 will be mainly described. The movable-side strainer 101 includes, as main components, a fixing portion 10, a movable portion 20, and a lever 30 (operation portion). The fixing portion 10 is fixed to the shell 103. The movable portion 20 is provided so as to be movable relative to the fixing portion 10 in a central axis direction (up-down direction) of the shell 103. Although details will be described later, the movable portion 20 is moved with respect to the fixing portion 10 in accordance with a rotation operation of the lever 30 by a user. By a movement of the movable portion 20, the movable portion 20 causes the snare wire 105 to transition between an ON state in which the snare wire 105 is in contact with the resonance head 104 and an OFF state in which the snare wire 105 is separated from the resonance head 104.

Figure 2:
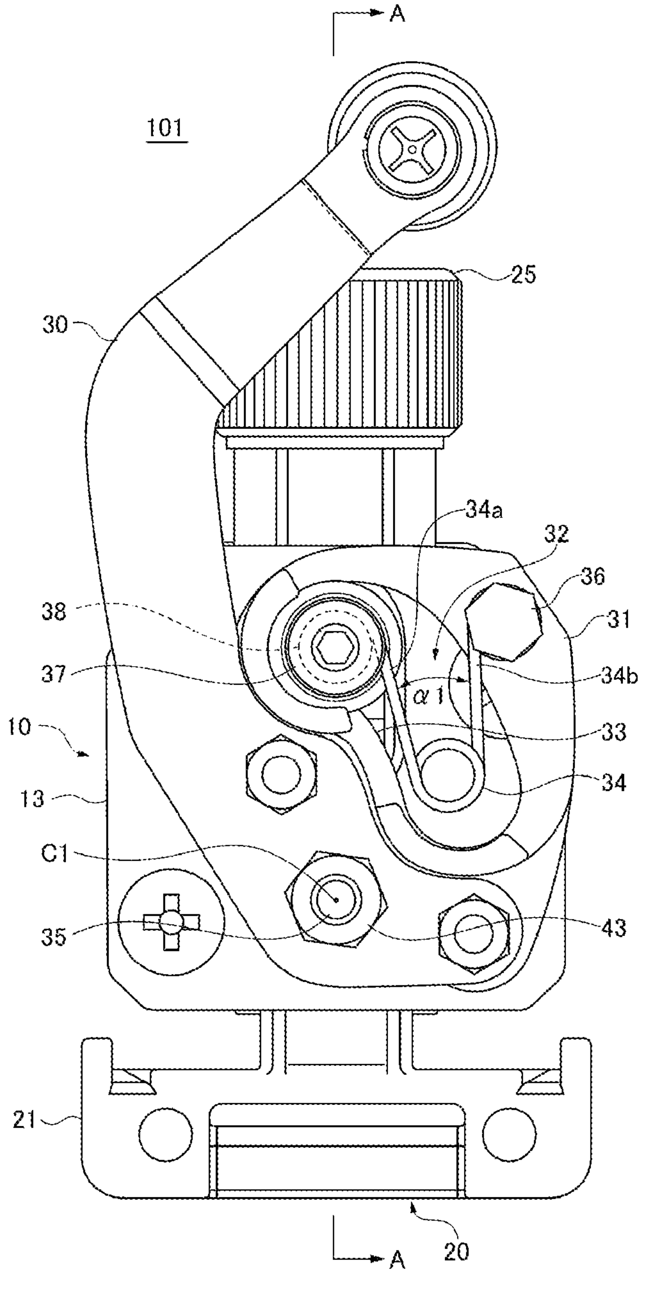
FIG. 2 is a rear view of a movable-side strainer.
Figure 3:
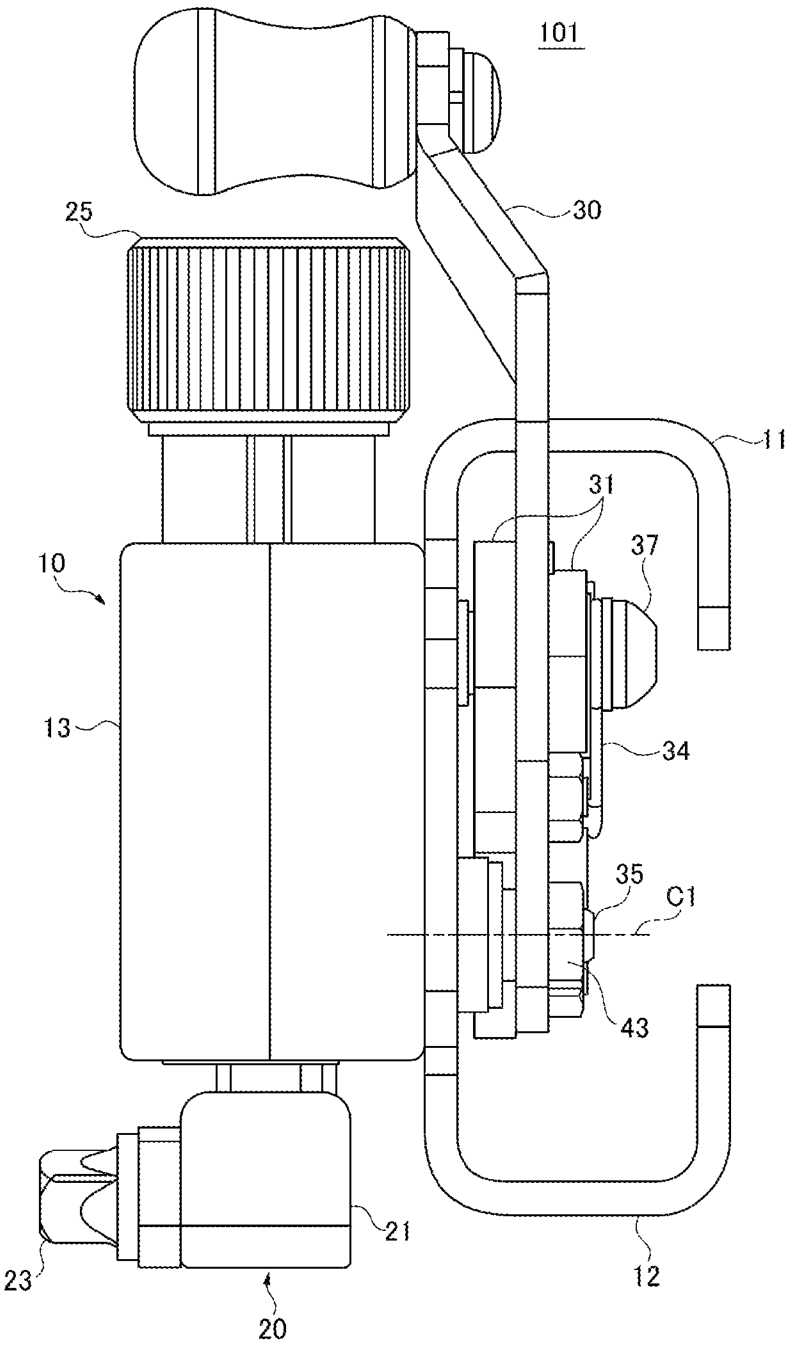
FIG. 3 is a side view of the movable-side strainer.
Figure 4:
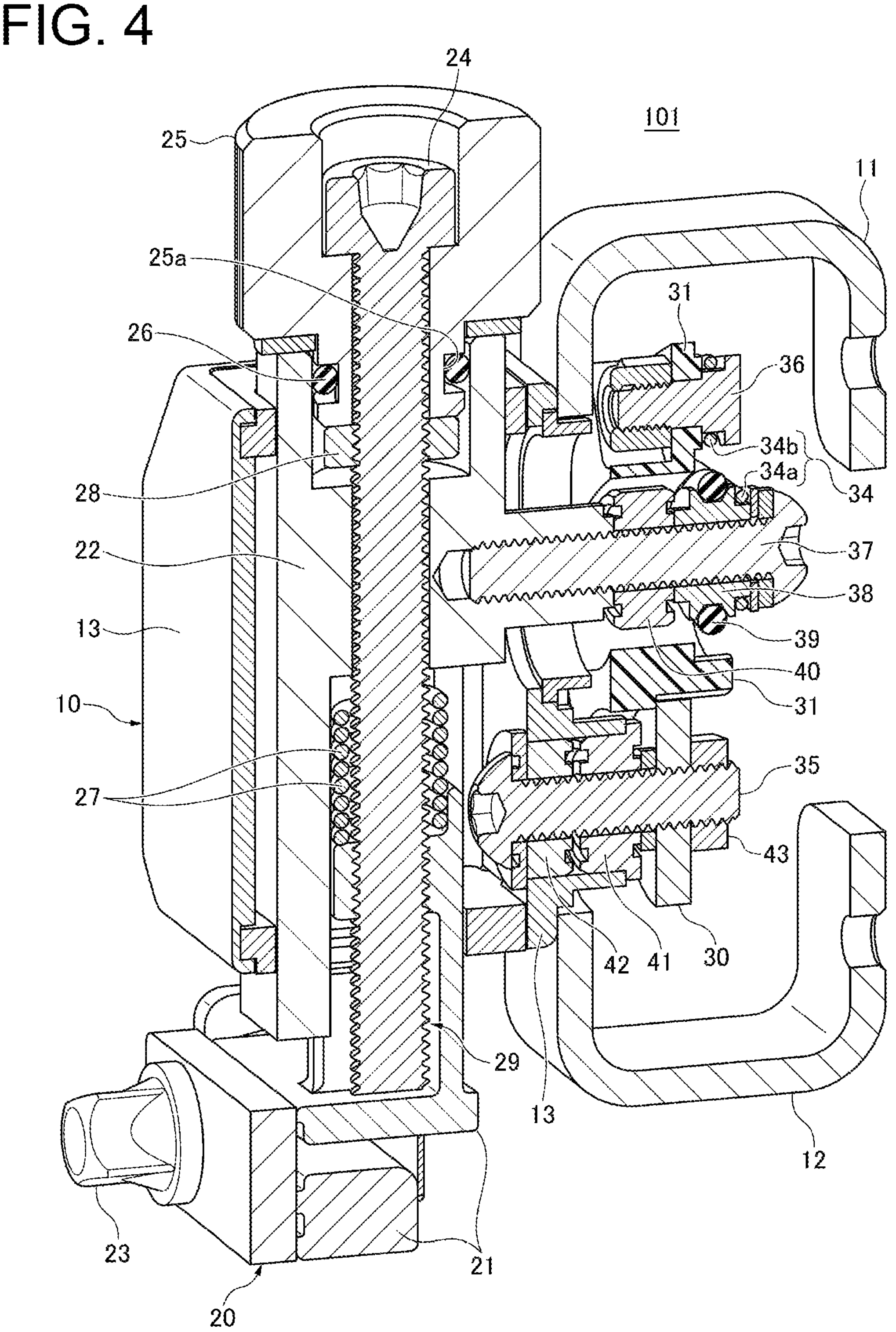
FIG. 4 is a perspective view showing a cross section of the movable-side strainer taken along a line A-A in FIG. 2.

FIG. 2 is a rear view of the movable-side strainer 101. A side on which the movable-side strainer 101 faces the shell 103 is referred to as a rear side of the movable-side strainer 101. FIG. 3 is a side view of the movable-side strainer 101. FIG. 4 is a perspective view showing a cross section of the movable-side strainer 101 taken along a line A-A in FIG. 2. In FIGS. 2 and 3, the lever 30 is at a rotation position corresponding to the ON state, and in FIG. 4, the lever 30 is at a rotation position corresponding to a transition state between the ON state and the OFF state.

The fixing portion 10 includes a case 13 and attachment portions 11 and 12. The attachment portions 11 and 12 are fixed to the case 13. By fixing the attachment portions 11 and 12 to the shell 103 with screws, the fixing portion 10 is attached to the shell 103.

As shown in FIG. 4, the movable portion 20 mainly includes a first moving body 21, a second moving body 22, an adjusting knob 25, and an adjusting bolt 24. A string member (not shown) extending from the snare wire 105 is fixed to the first moving body 21 by a screw 23. The adjusting knob 25 and the adjusting bolt 24 are fixed to each other via a nut 28. The adjusting bolt 24 is rotatable in the second moving body 22. When the adjusting knob 25 is rotated, the adjusting bolt 24 is rotated accordingly. A male screw portion 29 of the adjusting bolt 24 meshes with a female screw portion of the first moving body 21. An axial direction of the adjusting bolt 24 is parallel to the central axial direction of the shell 103. When the adjusting bolt 24 is rotated, a position of the first moving body 21 with respect to the adjusting bolt 24 in the axial direction of the adjusting bolt 24 changes. Therefore, for example, the user can adjust a tension level (tension) of the snare wire 105 by rotating the adjusting knob 25 in the ON state.

A spring 27 is disposed between the second moving body 22 and the outer periphery of the adjusting bolt 24. The spring 27 presses the first moving body 21 downward, and rattling between the first moving body 21 and the second moving body 22 is prevented. An O-ring 26 is provided in the vicinity of a neck of the adjusting bolt 24. The O-ring 26 is fitted in an outer peripheral groove formed in the adjusting knob 25, and is in contact with an inner peripheral surface of the second moving body 22. No screw is formed on the inner peripheral surface of the second moving body 22 with which the O-ring 26 is in contact. When the adjusting knob 25 is rotated, the adjusting knob 25 slides on the inner peripheral surface of the second moving body 22 via the O-ring 26. Since the O-ring 26 presses the adjusting knob 25 and the inner peripheral surface of the second moving body 22 by elasticity of the O-ring 26, the O-ring 26 functions to prevent loosening of the adjusting knob 25. The male screw portion 29 of the adjusting bolt 24 is generally locked at a position of engagement with the female screw portion of the first moving body 21. However, in the present embodiment, since the O-ring 26 is provided, it is possible to prevent loosening of the adjusting knob 25 and the adjusting bolt 24 with respect to the second moving body 22 in the rotation direction.

In a state where the position of the first moving body 21 with respect to the second moving body 22 is adjusted, the first moving body 21 and the second moving body 22 are integrally moved by the rotation operation of the lever 30. Normally, the user switches between the ON state and the OFF state by moving the movable portion 20 by the rotation operation of the lever 30 in a state where the position of the first moving body 21 with respect to the adjusting bolt 24 is adjusted to a desired position.

A screw 35 and a nut 43 are fixed to the lever 30. A shaft portion of the screw 35 is rotatably supported with respect to the case 13 via bearings 41 and 42. Therefore, the lever 30 is supported by the case 13 so as to be rotatable about central axes of the bearings 41 and 42 as a rotation axis C1. By providing the bearings 41 and 42, stable rotation of the lever 30 is realized. In addition, since the bearings 41 and 42 are disposed at two positions in the direction of the rotation axis C1, it is possible to prevent shaking of the lever 30 with respect to the rotation axis C1 and to realize stable rotation.

A cam member 31 is fixed to the lever 30 by a plurality of screws (FIG. 2). The cam member 31 is rotated integrally with the lever 30. The cam member 31 is formed of a resin or the like. The cam member 31 is formed with a cam portion 32 penetrating in the direction of the rotation axis C1 (FIG. 2). The cam portion 32 includes a cam surface 33.

A screw 37 is fixed to a rear side of the second moving body 22. A follower 40 and a spring hook member 38 are fixed to the screw 37. An O-ring 39 is attached around the spring hook member 38, and one end 34*a* of a torsion spring 34 is hooked on the spring hook member 38. The spring hook member 38 is a portion integrated with (fixed to) the follower 40. On the other hand, a spring hook screw 36 is fixed to the cam member 31. The other end 34*b* of the torsion spring 34 is hooked on the spring hook screw 36. The spring hook screw 36 is a portion integrated with (fixed to) the cam portion 32. The torsion spring 34 is an example of a pressing member that relatively presses the follower 40 against the cam surface 33. Instead of the torsion spring 34, another pressing member such as an elastic member such as a leaf spring may be employed.

Figure 5:
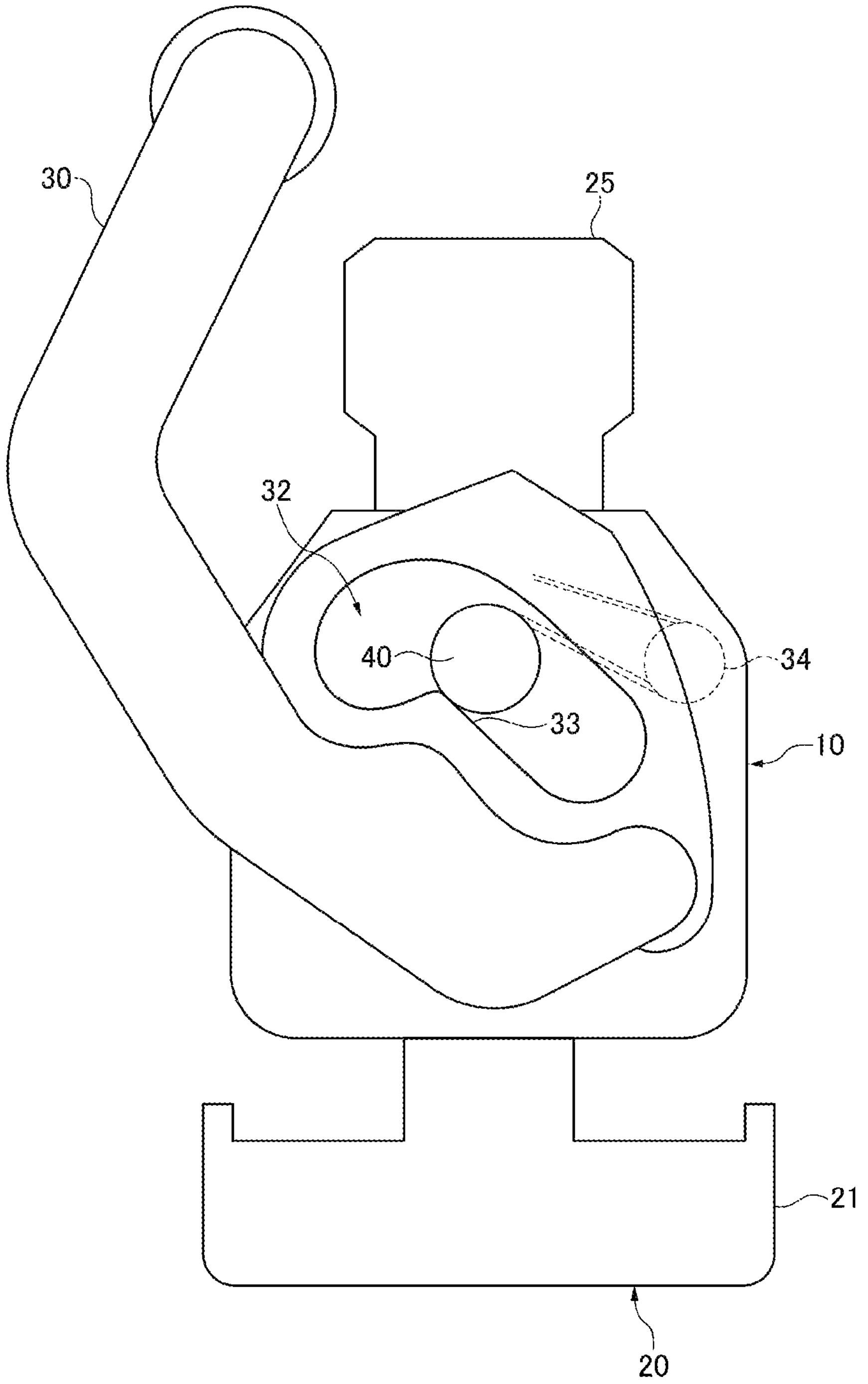
FIG. 5 is a schematic view showing a positional relationship among a fixing portion, a movable portion, and a lever.
Figure 6:
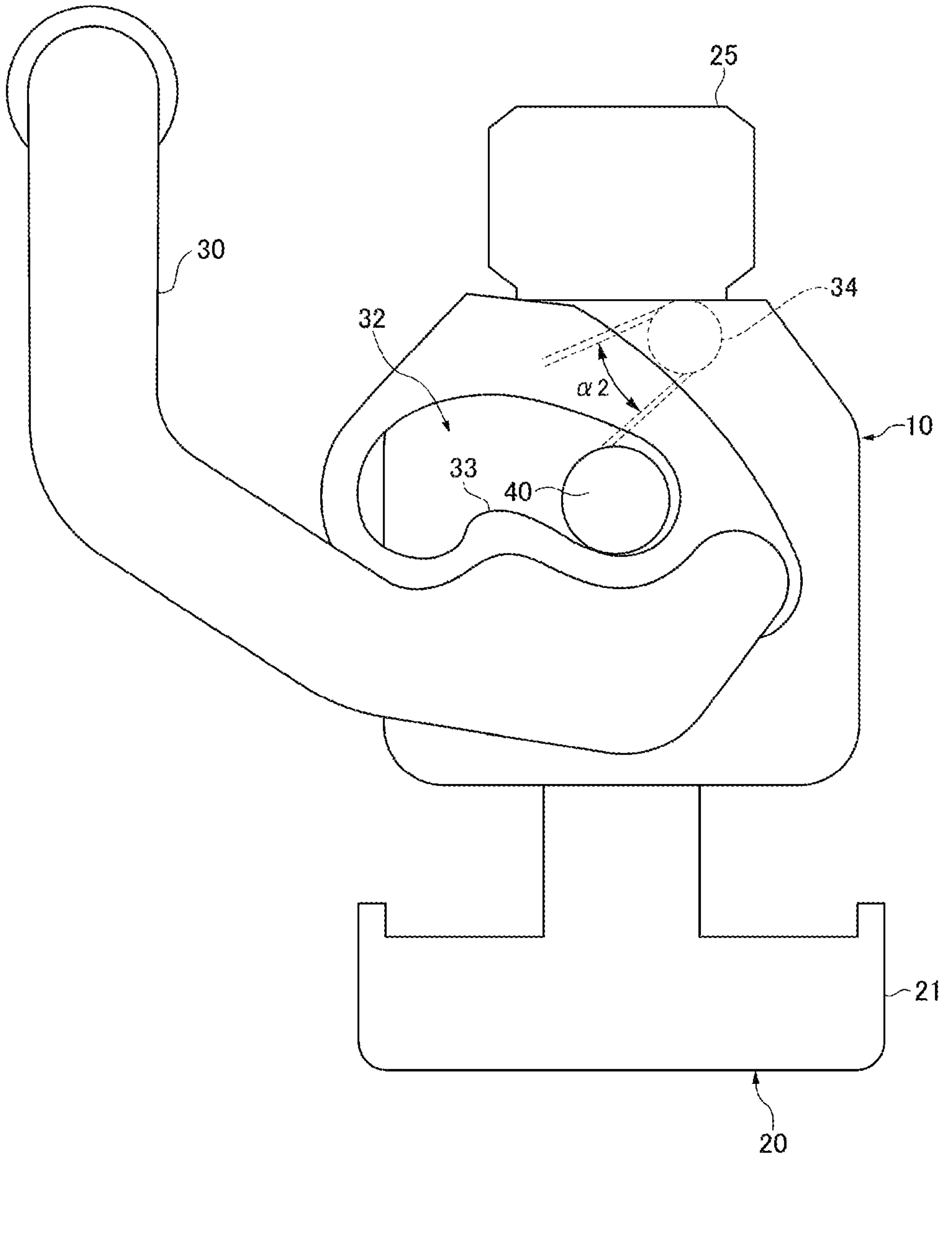
FIG. 6 is a schematic view showing a positional relationship among the fixing portion, the movable portion, and the lever.

FIGS. 5 and 6 are schematic views showing a positional relationship among the fixing portion 10, the movable portion 20, and the lever 30. In particular, FIG. 5 shows an intermediate state between the ON state and the OFF state of the movable side strainer 101, and FIG. 6 shows the OFF state. The ON state is shown in FIG. 2.

The follower 40 is relatively displaced with respect to the cam portion 32 in accordance with the rotation of the lever 30 while being pressed toward a cam surface 33 side. Since the follower 40 is fixed to the second moving body 22, the follower 40 is moved integrally with the movable portion 20 in the axial direction of the adjusting bolt 24. When the lever 30 is rotated in a counterclockwise direction in FIG. 2 from the ON state (FIG. 2), the follower 40 slides on the cam surface 33, and the movable-side strainer 101 transitions to the intermediate state (FIG. 5). When the lever 30 is further rotated in the counterclockwise direction, the follower 40 slides on the cam surface 33, and the movable-side strainer 101 transitions to the OFF state (FIG. 6). Hereinafter, a detailed configuration of the cam portion 32 and a relationship between the cam portion 32 and the follower 40 will be described with reference to FIGS. 7 to 10.

Figure 7:
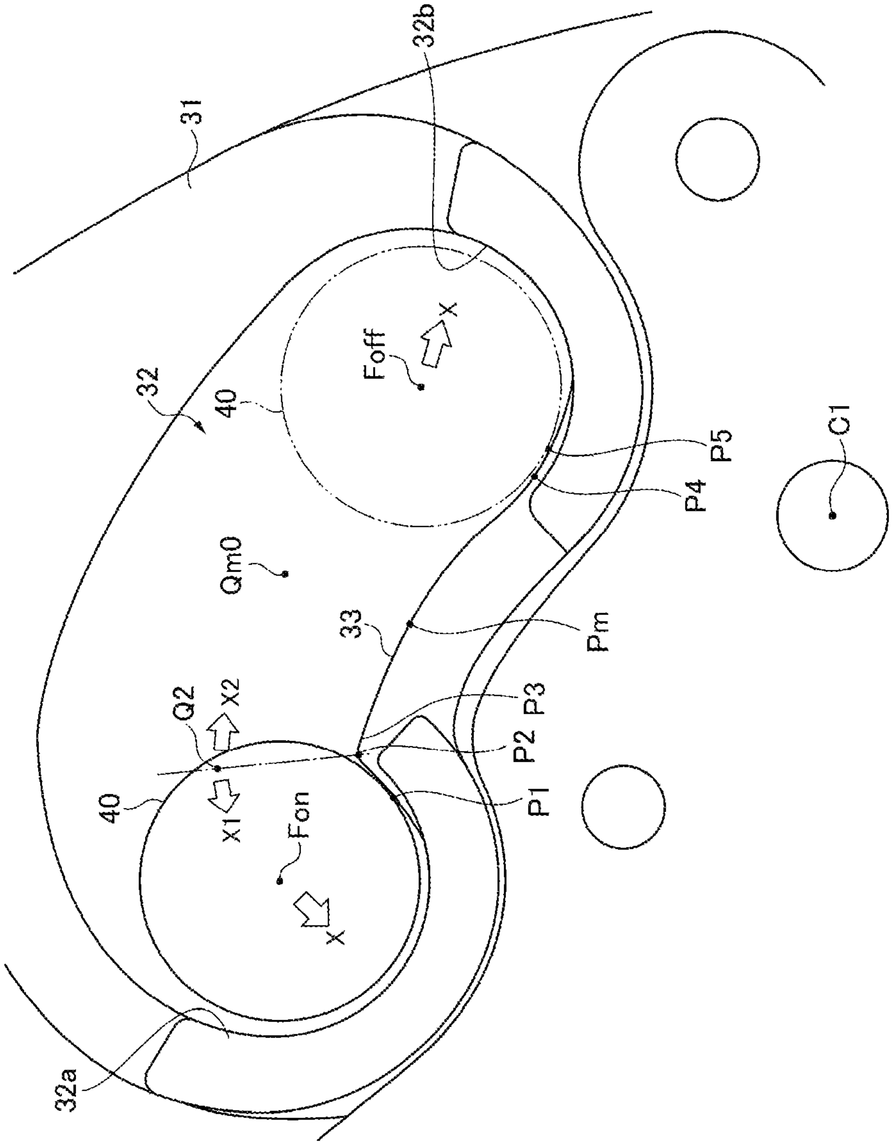
FIG. 7 is a partially enlarged view of a cam portion.
Figure 8:
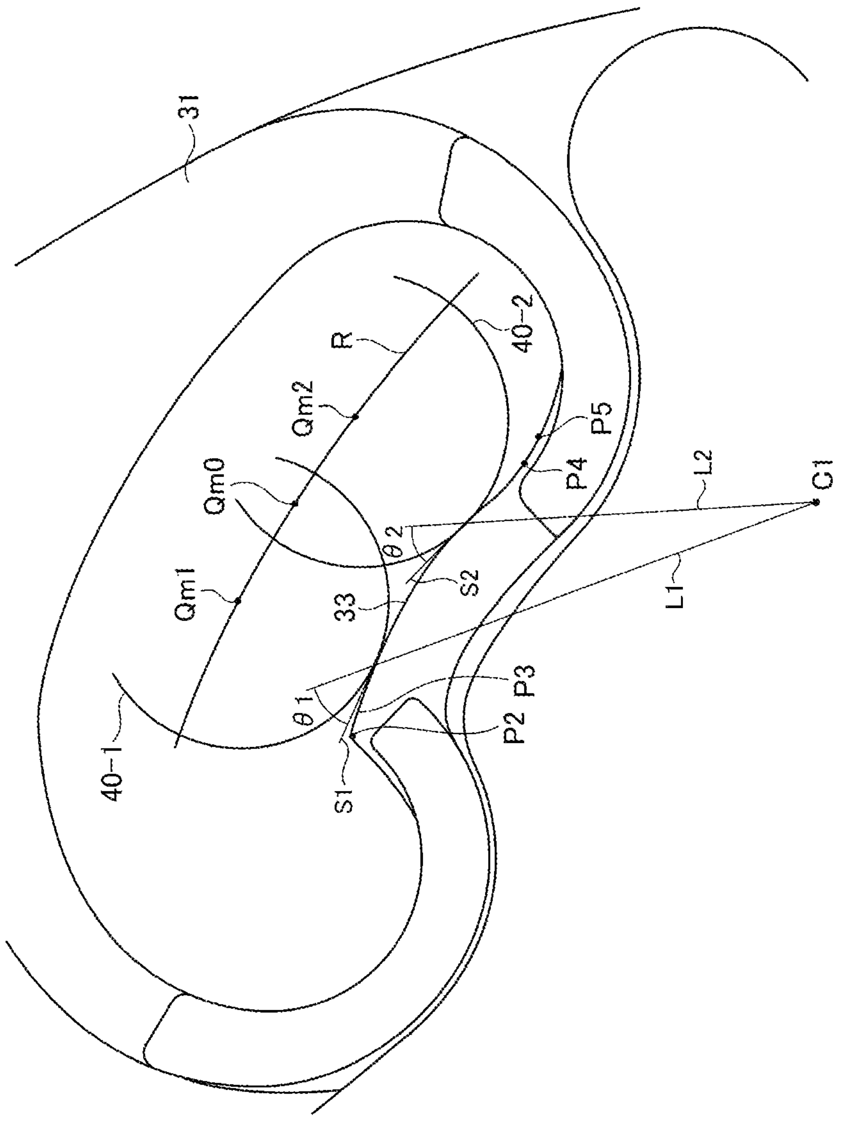
FIG. 8 is a partially enlarged view of the cam portion.

FIGS. 7 and 8 are partially enlarged views of the cam portion 32. In FIGS. 7 and 8, the cam member 31 is viewed from the rear side. An ON position Fon and an OFF position Foff are center positions of the follower 40 corresponding to the ON state and the OFF state, respectively.

As shown in FIG. 7, a continuous surface in a range of points P1 to P5 is the cam surface 33. The cam portion 32 includes restricting portions 32*a* and 32*b* at both ends of the cam portion 32 in a longitudinal direction of the cam portion 32. When the O-ring 39 abuts against the restricting portions 32*a* and 32*b*, a range of movement of the follower 40 with respect to the cam portion 32 is restricted. Therefore, as for a contact range of the follower 40 with respect to the cam surface 33, the range of the points P1 to P5 is a relative movable range of the follower 40. The follower 40 itself does not come into contact with the restricting portions 32*a* and 32*b*. The O-ring 39 abuts against the restricting portions 32*a* and 32*b*, so that noise is prevented.

All of the points P2, P3, Pm, and P4 are intermediate positions on the cam surface 33 in a relative movement stroke of the follower 40 with respect to the cam portion 32. In particular, the point P2 is a convex portion (ridge portion), and serves as a generation point of a positive resistance as described later. When a center of the follower 40 is in the ON position Fon and the OFF position Foff, contact points between the follower 40 and the cam surface 33 are a point P1 (first position) and a point P5 (second position), respectively. When the center of the follower 40 is in intermediate positions Q2 and Qm0, the contact points between the follower 40 and the cam surface 33 are points P2 and Pm, respectively.

Since the follower 40 is pressed against the cam surface 33 by the torsion spring 34, the resultant force X acts on the follower 40 by the cooperation of the pressing force from the torsion spring 34 and the reaction force at the cam surface 33. A relative direction of the resultant force X with respect to the cam portion 32 is switched between an X1 side and an X2 side at the point P2. With a line segment connecting the point P2 and the intermediate position Q2 as a boundary, the X1 side is a side (a point P1 side; a first position side) where the point P1 is located when viewed from the point P2, and the X2 side is a side (a point P5 side; a second position side) where the point P5 is located when viewed from the point P2.

In particular, focusing on a contact region between the cam surface 33 and the follower 40, the relative direction of the resultant force X with respect to the cam portion 32 is the X1 side in viewed from the point P2 when the follower 40 is at the point P1, and is the X2 side in viewed from the point P2 when the follower 40 is at the point P5. Therefore, the follower 40 receives a force to maintain the ON state in the ON state, and receives a force to maintain the OFF state in the OFF state. Therefore, in each of the ON state and the OFF state, the state is the same as a locked state. Therefore, the ON state and the OFF state of the snare wire 105 are stably maintained.

In other words, when the follower 40 is on the X1 side with respect to the intermediate position Q2 (that is, when the contact point is in the range of the point P1 to the point P2), the relative direction of the resultant force X is on the X1 side when viewed from the point P2. When the follower 40 is on the X2 side with respect to the intermediate position Q2 (that is, when the contact point is in the range of the point P2 to the point P5), the relative direction of resultant force X is on the X2 side when viewed from point P2. In this way, since the relative direction of the resultant force X is switched at the intermediate position Q2 as a boundary, it is not necessary to operate the lever 30 with an excessive force, and the lever 30 can be smoothly shifted to the ON state or the OFF state, so that the operability is high.

The operation of the torsion spring 34 will be described. The torsion spring 34 has a configuration in which one end 34*a* and the other end 34*b* extend from an annular portion in a bifurcated manner (FIG. 2). A degree of opening of the torsion spring 34 formed the two ends 34*a* and 34*b* in a neutral state is, although not shown, about 90 degrees. The degree of opening of the torsion spring 34 is the smallest when the center of the follower 40 is located at the intermediate position Q2. For example, in FIG. 5, the center of the follower 40 is positioned in the vicinity of the intermediate position Q2, and the degree of opening of the torsion spring 34 is a negative value when grasped by an angle of the two ends 34*a* and 34*b*. The degree of opening of the torsion spring 34 is angles $\alpha 1$ and $\alpha 2$ (FIGS. 2 and 6) when the center of the follower 40 is positioned at the ON position Fon and the OFF position Foff. All of these degrees of opening are smaller than the degree of opening of the torsion spring 34 in the free state, and larger than the degree of opening of the torsion spring 34 when the center of the follower 40 is positioned at the intermediate position Q2. With this configuration, when passing through the intermediate position Q2, a necessary operation force to the ON position Fon side and the OFF position Foff side is weakened, and the operability is improved.

Moreover, the point P2 is a convex portion, and when the follower 40 is moved on the convex portion, a positive resistance is generated in the follower 40. In addition, the point P2 is positioned closer to the point P1 than the point P5. Therefore, in the process of operating the lever 30, the positive resistance can be given to the lever 30 near the position where the lever 30 is in the ON state. Therefore, when passing through the intermediate position Q2, the operation becomes lighter after the positive resistance is generated. Also in this respect, the operability and the operation feeling are improved.

A detailed shape of the cam surface 33 will be described with reference to FIG. 8. In particular, features of a range of the points P3 to P4 in the cam surface 33 will be described.

In FIG. 8, the followers 40 having center positions at intermediate positions Qm1 and Qm2 are referred to as followers 40-1 and 40-2. A locus curve R is a relative locus curve of the center position of the follower 40 with respect to the cam surface 33 in the range of points P3 to P4. In the range of the points P3 to P4, the locus curve R is positioned on an equiangular spiral (logarithmic spiral) around the rotation axis C1.

Straight lines L1 and L2 are straight lines (moving diameters) passing through the rotation axis C1 and the contact points between the followers 40-1 and 40-2 and the cam surfaces 33 at the intermediate positions Qm1 and Qm2. Tangent lines S1 and S2 are tangent lines between the followers 40-1 and 40-2 and the cam surface 33. An angles θ1 and θ2 are angles formed by the straight lines L1 and L2 and the tangent lines S1 and S2 on the X1 side (see FIG. 7) in the cam portion 32. In the range of the points P3 to P4, since the locus curve R is an equiangular spiral, the angle θ1 is equal to the angle θ2. With such a configuration, a component force acting on the follower 40 becomes constant. Therefore, it is easy to design the operating force of the lever 30 to be uniform in the range of the points P3 to P4.

Figure 9:
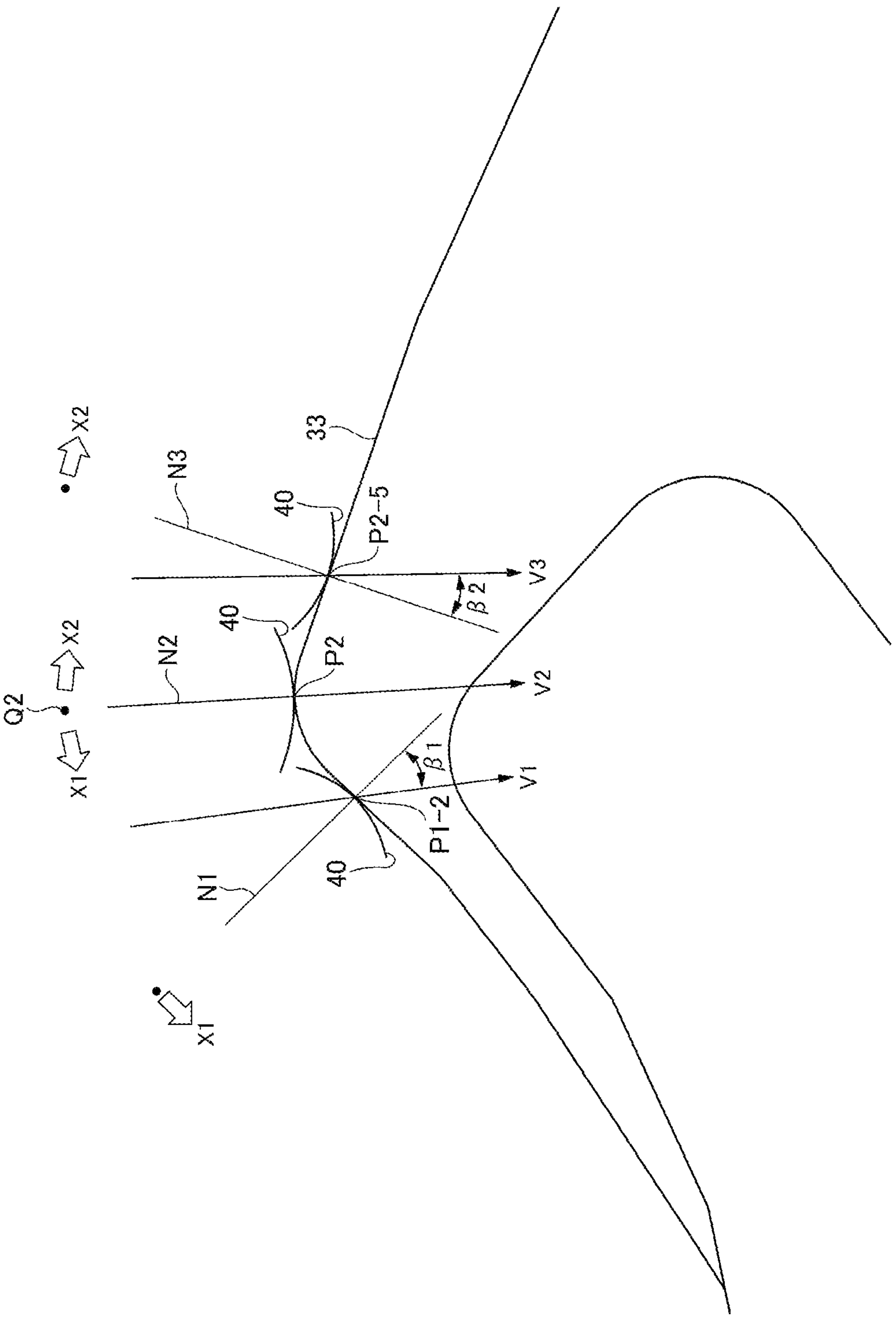
FIG. 9 is a partially enlarged view of a cam surface.

FIG. 9 is a partially enlarged view of the vicinity of the point P2 of the cam surface 33. In FIG. 7, it has been described that the relative direction of the resultant force X acting on the follower 40 is switched at the point P2 as a boundary. This will be considered from another viewpoint with reference to FIG. 9.

In FIG. 9, a point P1-2 is a contact point between the follower 40 and the cam surface 33 between the point P1 and the point P2 on the cam surface 33. A point P2-5 is a contact point between the follower 40 and the cam surface 33 between the point P2 and the point P5 on the cam surface 33. Normal vectors N1, N2, and N3 indicate normal vectors of the cam surface 33 passing through the points P1-2, the point P2, and the point P2-5, respectively. Vectors V1, V2, and V3 indicate vectors of forces applied (pushed) to the followers 40 by the torsion springs 34.

The normal vector N1 and the vector V1 form an angle (31 on a rotation axis C1 side (vector direction) when viewed from the cam surface 33. The normal vector N3 and the vector V3 form an angle (32 on the rotation axis C1 side (vector direction) when viewed from the cam surface 33. The angle (31 and the angle (32 are opposite to each other with respect to the normal vector. An angle formed between the normal vector N2 and the vector V2 on the rotation axis C1 side when viewed from the cam surface 33 is 0 degree.

That is, when the follower 40 comes into contact with the cam surface 33 at the point P2, the vector V2 and the normal vector N2 become parallel to each other. Further, in the range of the points P1 to P2, the vector V1 is on the X1 side with respect to the normal vector N1 on the rotation axis C1 side when viewed from the cam surface 33. In the range of the points P2 to P5, the vector V3 is on the X2 side with respect to the normal vector N3 on the rotation axis C1 side. With this configuration, when the follower 40 passes through the point P2, the necessary operation force to the ON position Fon side and the OFF position Foff side is weakened, and the operability is improved.

According to the present embodiment, the relative direction of the resultant force X acting on the follower 40 with respect to the cam portion 32 is the X1 side when viewed from the intermediate position (point P2) when the follower 40 is at the point P1. The relative direction of the resultant force X with respect to the cam portion 32 is the X2 side when viewed from the intermediate position when the follower 40 is at the point P5. Therefore, the ON state and the OFF state of the snare wire 105 can be stably maintained with a simple configuration.

Here, in JP-B-4977161, since the spring always pushes the snare wire toward the OFF position side, a force from the spring acts as resistance over the entire stroke when the lever is rotated toward the ON position side. Therefore, there is room for improvement in the operability of the lever. On the other hand, in the present embodiment, the follower 40 receives a force for maintaining the ON state and the OFF state, separately, in the ON state and the OFF state.

On the other hand, in the present embodiment, the relative direction of the resultant force X is the X1 side when viewed from the point P2 when the follower 40 is in the range of the points P1 to P2, and is the X2 side when viewed from the point P2 when the follower 40 is in the range of the points P2 to P5. That is, the relative direction of the resultant force X is switched between the X1 side and the X2 side at the point P2 (intermediate position Q2). From another viewpoint, the vectors V1 to V3 and the normal vectors N1 to N3 are parallel to each other at the point P2 (FIG. 9). Therefore, since the lever 30 smoothly transitions to the ON state or the OFF state without being operated by an excessive force, the operability can be improved.

Further, the degree of opening of the torsion spring 34 when the center of the follower 40 is positioned at the ON position Fon and the OFF position Foff is smaller than that in the free state, and is larger than that when the center of the follower 40 is positioned at the intermediate position Q2. Therefore, since the necessary operation force is weakened at the intermediate position Q2 as a boundary, the operability can be improved. Further, the point P2 close to the point P1 is a convex portion, and a positive resistance is generated in the follower 40 near a position where the follower 40 is in the ON state, so that operability and an operation feeling are improved.

In addition, since the lever 30 is rotatably supported by the bearings 41 and 42 disposed at two positions in the direction of the rotation axis C1, it is possible to realize stable rotation while preventing shaking of the lever 30.

In addition, since the cam surface 33 includes a region (a range of the points P3 to P4) in which the relative locus curve R of the follower 40 with respect to the cam portion 32 is positioned on an equiangular spiral around the rotation axis C1, it is easy to design the lever 30 so as to make the operation force uniform.

Figure 10:
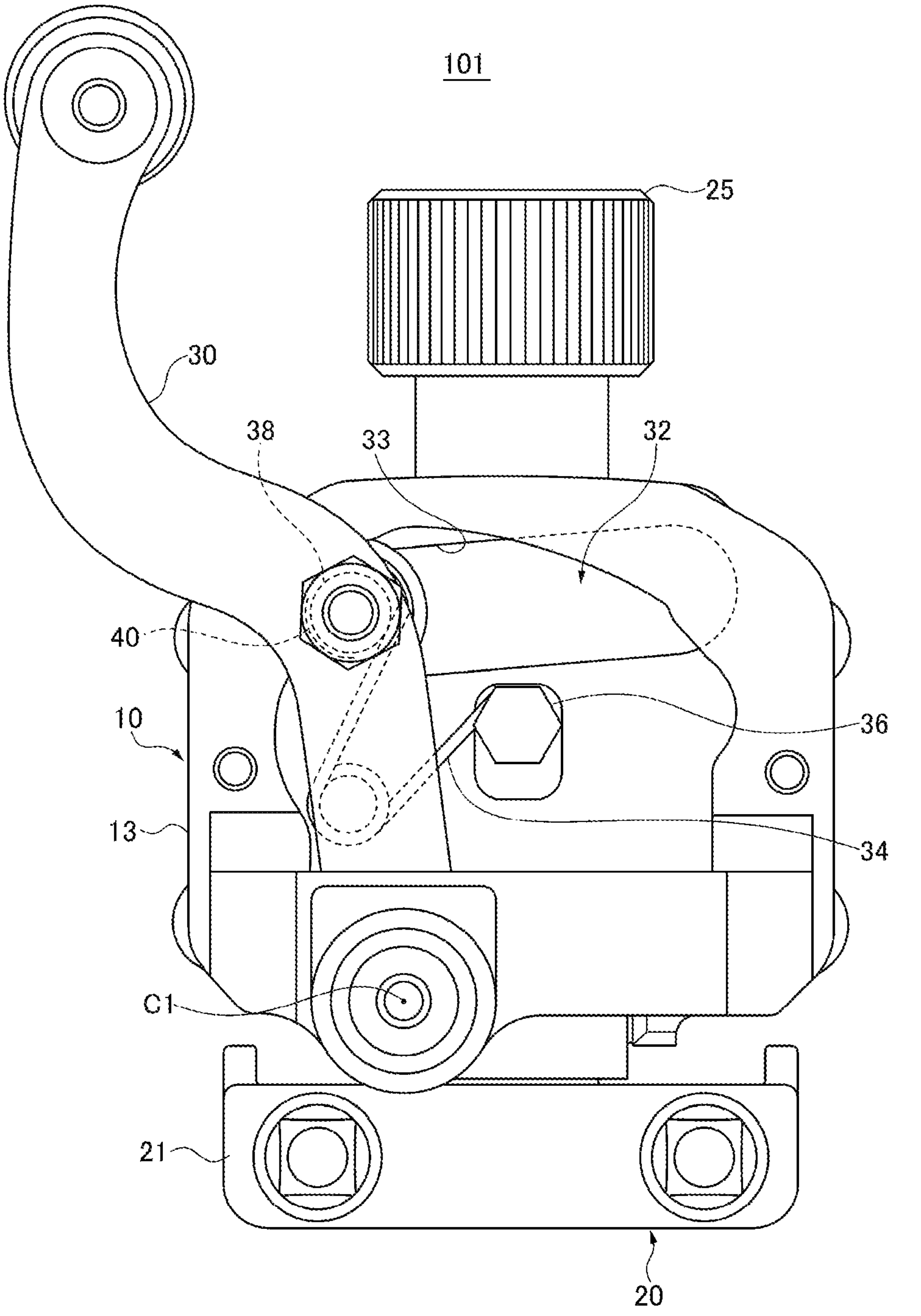
FIG. 10 is a rear view of a movable-side strainer according to a modification.

FIG. 10 is a rear view of a movable-side strainer 101 according to a modification. In an example shown in FIG. 2, the cam portion 32 is provided on the lever 30, and the follower 40 is provided on the movable portion 20. However, conversely, as in a modification shown in FIG. 10, a configuration may be adopted in which the cam portion 32 is provided on the movable portion 20, and the follower 40 is provided on the lever 30. That is, the cam portion having the cam surface may be provided on one of the movable portion and the operation portion, and the follower may be provided on the other of the movable portion and the operation portion.

In the modification shown in FIG. 10, the lever 30 is rotatable about the rotation axis C1 with respect to the fixing portion 10. In FIG. 10, the ON state is shown, and a clockwise direction in FIG. 10 is a rotating direction in which the OFF state is achieved. The spring hook member 38 is a portion integrated with the follower 40, and the spring hook screw 36 is a portion integrated with the cam portion 32. The torsion spring 34 is engaged with the spring hook member 38 and the spring hook screw 36. The follower 40 is pressed against the cam surface 33 of the cam portion 32 by the torsion spring 34. Other basic configurations are the same as those of an example shown in FIG. 2.

The configuration employed in the example shown in FIG. 2 (such as the feature of the shape of the cam surface 33) can also be applied to the modification (FIG. 10) as long as there is no contradiction.

Although the present disclosure has been described in detail based on the preferred embodiments thereof, the present disclosure is not limited to these specific embodiments, and various embodiments within the scope not departing from the gist of the present disclosure are also included in the present disclosure.

What is claimed is:

1. A strainer device for a drum, the strainer device comprising:

a fixing portion attachable to a shell of the drum;

an operation portion configured to be rotatable with respect to the fixing portion;

a movable portion configured to be movable with respect to the fixing portion in accordance with a rotation of the operation portion to change a snare wire between an ON state where the snare wire is in contact with a drum head of the drum and an OFF state where the snare wire is separated from the drum head;

a pressing member;

a cam portion including a cam surface provided on one of the movable portion or the operation portion; and a follower provided on the other of the movable portion or the operation portion, and configured to be relatively displaced with respect to the cam portion between a first position and a second position in the cam portion in accordance with the rotation of the operation portion while the pressing member is pressing the follower against the cam surface of the cam portion, wherein a direction of a force from the pressing member acting on the follower with respect to the cam portion is directed to:

a side of the first position within the cam portion in a state where the follower is disposed in the first position; and a side of the second position in a state where the follower is disposed in the second position.

2. The strainer device according to claim 1, wherein the direction of the force acting on the follower with respect to the cam portion is switched between the side of the first position and the side of the second position.

3. The strainer device according to claim 1, wherein:

the pressing member is a torsion spring, and a first degree of opening of the torsion spring in the state where the follower is positioned at the first position and a second degree of opening of the torsion spring in the state where the follower is positioned at the second position each are smaller than a third degree of opening of the torsion spring in a neutral state and larger than a fourth degree of opening of the torsion spring in a state where the follower is positioned at an intermediate position between the first and second positions.

4. The strainer device according to claim 3, wherein one end of the torsion spring is in contact with part of the follower, and the other end of the torsion spring is in contact with part of the cam portion.

5. The strainer device according to claim 2, wherein:

the ON state of the snare wire is where the follower is disposed in the first position and the OFF state of the snare wire is where the follower is disposed in the second position, the cam follower is movable to an intermediate position between the first position and the second position, the intermediate position being closer to the first position than the second position, the cam surface at which the cam follower is disposed in the intermediate position includes a convex portion, and a positive resistance of the follower is generated as the follower moves over the convex portion.

6. The strainer device according to claim 1, further including bearings rotatably supporting the operation portion with respect to the fixing portion.

7. The strainer device according to claim 6, wherein the bearings are disposed at two positions along an axial direction of a rotation axis of the operation portion.

8. The strainer device according to claim 1, wherein the cam surface includes a region where a relative locus curve of the follower with respect to the cam portion is positioned on an equiangular spiral around a rotation axis of the operation portion.

9. The strainer device according to claim 1, wherein a vector of a force applied to the follower by the pressing member and a normal vector passing through a contact point between the follower and the cam surface are parallel to each other at an intermediate position between the first position and the second position in the movement stroke of the follower with respect to the cam portion.

10. The strainer device according to claim 9, wherein:

in a state where the follower is disposed on the side of the first position relative to the intermediate position, the vector is directed to the side of the first position with respect to the normal vector, and in a state where the follower is disposed on the side of the second position relative to the intermediate position, the vector is directed to the side of the second position with respect to the normal vector.

11. The strainer device according to claim 1, wherein:

the movable portion comprises a first moving body, a second moving body, an adjusting knob, and an adjusting bolt, the adjusting knob is fixed to the adjusting bolt via a nut, the adjusting bolt is rotated together with the adjusting knob, the adjusting bolt is rotatably housed in the second moving body, the first moving body includes a screw portion, the adjusting bolt includes a screw portion that meshes with the screw portion of the first moving body, a position of the first moving body with respect to the adjusting bolt in an axial direction of the adjusting bolt changes in response to a rotation of the adjusting bolt to adjust a tension of the snare wire fixed to the first moving body, the adjusting knob includes an outer peripheral groove, the strainer device includes an O-ring disposed at the outer peripheral groove on the adjusting knob, and in contact with an inner peripheral surface of the second moving body, and the O-ring presses the adjusting knob and the inner peripheral surface of the second moving body by elasticity of the O-ring.

12. The strainer device according to claim 1, wherein the pressing member generates a pressing power against the cam portion in a case of switching between the ON state and the OFF state, the pressing power being greater than pressing powers of the pressing member against the cam portion in the ON state and the OFF state.

13. A strainer device for a drum, the strainer device comprising:

a fixing portion attachable to a shell of the drum;

an operation portion configured to be rotatable with respect to the fixing portion;

a movable portion configured to be moved with respect to the fixing portion in accordance with a rotation in a one direction of the operation portion to change a snare wire between an ON state where the snare wire is in contact with a drum head of the drum and an OFF state where the snare wire is separated from the drum head;

a cam portion including a cam surface provided on one of the movable portion or the operation portion;

a follower provided on the other of the movable portion or the operation portion, and configured to move along the cam surface; and a pressing member configured to press the follower against the cam surface, wherein the cam surface includes:

a first region that generates a first component of power in a direction opposite to the one direction, the first component of power being added to a counterforce of a first pressed power on the first region of the cam surface received from the follower; and a second region that generates a second component of power in the one direction, the second component of power being added to a counterforce of a second pressed power on the second region of the cam surface received from the follower.

14. The strainer device according to claim 13, wherein the pressing member generates a third pressing power against the follower in a state where the cam follower is moving over a boundary portion between the first region and the second region, the third pressing power being greater than pressing powers of the pressing member against the follower in the ON state or the OFF state.

* * * * *